Patented Jan. 4, 1938

2,104,017

UNITED STATES PATENT OFFICE 2,104,017

CELLULOSE ETHER PURIFICATION

Russell R. Bradshaw, Midland, Mich., assignor to The Dow Chemical Company, Midland, Mich., a corporation of Michigan No Drawing. Application January 18, 1937, Serial No. 121,169

12 Claims. (Cl. 260—152)

This invention relates to methods for the purification of cellulose ethers.

Cellulose ethers, as ordinarily prepared by the treatment of alkali cellulose with an etherifying agent, are contaminated with foreign substances which cause solutions of the cellulose ether and films prepared therefrom to be discolored and murky. An object of this invention is to provide a method for the purification of such crude cellulose ethers, whereby products capable of forming colorless solutions and clear haze-free films will be formed. A particular object of the invention is to provide a process whereby a crude ethyl cellulose can be economically clarified without concurrent degradation or change in viscosity characteristics of the ethyl cellulose during treatment.

I have now found that the foregoing objects can be accomplished by the treatment with chlorine of a mixture of a crude cellulose ether in a substantially non-aqueous solvent therefor. The method of carrying out the invention will hereinafter be described with particular reference to the clarification and purification of ethyl cellulose, but it is not intended to limit it thereto, it being equally applicable to the treatment of other cellulose ethers.

One method of carrying out the purification of crude ethyl cellulose obtained by the ethylation of alkali cellulose comprises drying the same and mixing the dry product with carbon tetrachloride or other suitable solvents to form a solution containing from about 5 per cent to about 20 per cent by weight of ethyl cellulose. This solution is then filtered or centrifuged to remove suspended matter, and mixed with chlorine dissolved in carbon tetrachloride or other non-aqueous inert solvent therefor. The amount of chlorine employed is between about 1 and about 10 per cent of the weight of the crude ethyl cellulose. The chlorine-treated mixture is agitated at room temperature for a relatively short time, e. g., for about 5 to 10 minutes, by which time complete decolorization of the solution has occurred. The purified ethyl cellulose is then recovered, suitably by mixing the bleached solution thereof with water maintained at a temperature above the boiling point of the solvent employed, thereby flashing off the solvent and precipitating the ethyl cellulose.

It has been found to be an equally satisfactory procedure to bubble gaseous chlorine directly into the solution of cellulose ether, instead of first forming a solution of chlorine in an inert solvent, and then adding the chlorine solution to the cellulose ether solution.

Inert solvents which have proven satisfactory for use in the invention include carbon tetrachloride, chloroform, methylene chloride, ethylene chloride, vinylidene chloride, propylene chloride, methyl chloroform, 1,1,2-trichloro-ethane, benzene, toluene, xylene, chlorobenzene, orthodichlorobenzene, the lower aliphatic monohydric alcohols, e. g. methyl-, ethyl-, propyl, and isopropyl alcohols, and the esters of said alcohols and the simpler aliphatic carboxylic acids and hydroxy derivatives thereof, e. g. acetic, formic, propionic, glycolic, and lactic acids. It is ordinarily most convenient to employ as solvents those materials boiling below the boiling point of water so that recovery of the solvent may be accomplished by contacting the solution of the cellulose ether with hot water. Under the conditions which I prefer to employ, chlorine does not appear to act upon alcohols when these are used as solvents in the purification.

The cellulose ether solutions used for the determination of color and viscosity characteristics, and hereinafter referred to as "standard solutions", were invariably prepared as follows: the cellulose ether was dissolved to the extent of 5 per cent by weight in a mixture of 33 parts by volume of methyl alcohol and 67 parts by volume of benzene.

The following examples illustrate various modes of practicing my invention.

Example 1

A crude ethyl cellulose, whose standard solution exhibited a marked slate color, and had a viscosity of 19 centipoises, was dissolved in 95 per cent ethyl alcohol to form a 10 per cent solution therein. Chlorine gas was bubbled through the solution until an amount of chlorine had been used which was equivalent to 4 per cent of the weight of the dissolved ethyl cellulose. The solution was rapidly bleached upon the addition of the chlorine. Following completion of the reaction, the alcoholic solution was slowly run into a large volume of water which was maintained at a temperature above the boiling point of the alcohol. The alcohol vapors were flashed off and recovered by condensation. The purified ethyl cellulose was precipitated immediately upon contact with water. This precipitate was washed with further volumes of pure water until the washings were free from traces of acids and chlorides. The product was dried and a standard solution thereof was colorless, had a viscosity of 19 centipoises, and yielded a film which was entirely free from haze and which showed no evidences of any of the slate color which had characterized the crude material.

Example 2

A crude ethyl cellulose, whose standard solution had a caramel color and a viscosity of 35 centipoises, was treated in a manner analogous to that described above. The amount of chlorine used in this instance was 1.8 per cent based upon the weight of the ethyl cellulose in alcoholic solution. As in the previous instance the original color of the solution disappeared almost immediately upon introduction of the chlorine. When the ethyl cellulose was precipitated in the manner previously described, washed and dried, its standard solution was almost entirely colorless and had a viscosity of 35 centipoises. Films produced from this solution were haze-free.

Example 3

50 pounds of colored crude ethyl cellulose, whose standard solution had a viscosity of 43 centipoises, was dissolved in 450 pounds of methanol and filtered to remove suspended impurities. To this solution was added, gradually, 2 gallons of carbon tetrachloride containing 6.5 per cent by weight of free chlorine dissolved therein. A very slight increase in the temperature of the ethyl cellulose solution and a simultaneous decolorization thereof were noticed upon the addition of the chlorine-carbon tetrachloride solution. The entire mixture was stirred at room temperature for a period of from 5 to 10 minutes and the solvent mixture, i. e., methyl alcohol and carbon tetrachloride, was recovered in a manner analogous to that described in the foregoing example. The precipitated ethyl cellulose, when dried, yielded standard solutions which were practically free from any color and which had a viscosity of 43 centipoises.

Various modifications of the foregoing procedure may be as satisfactorily employed. For example, in the step of precipitating the purified cellulose ether by mixing the non-aqueous solution thereof with hot water, the solvent may be driven off, as in the examples, by pouring the cellulose ether solution into the water at a temperature above the boiling point of the solvent, or, if desired, cold water may be used and the temperature of the mixture gradually increased until the boiling point of the solvent, or of a mixture of the same and of water, is attained. When the chlorine is introduced into the solution of crude cellulose ether in the form of a solution thereof in a suitable solvent, this solvent may be the same as, or different from, the solvent employed to dissolve the cellulose ether. Instead of a single solvent, a combination of two or more solvents may be used to dissolve the crude cellulose ether.

In most instances, a very small amount of chlorine is required to accomplish the desired result. In no case has it been found necessary to employ an amount of chlorine greater than 10 per cent of the weight of the ethyl cellulose being treated, and in most instances 4 percent of this weight has proven entirely satisfactory. This is equally true irrespective of the manner in which the chlorine is introduced into the cellulose ether solution, i. e., as gaseous chlorine or as a solution thereof in an inert solvent.

The hereindescribed process can be applied to the treatment of methyl, ethyl, propyl, butyl, ethyl propyl, ethyl benzyl, or other lower alkyl, aralkyl, or mixed alkyl-aralkyl ethers of cellulose.

Other modes of applying the principle of my invention may be employed instead of those explained, change being made as regards the method herein disclosed, provided the step or steps stated by any of the following claims or the equivalent of such stated step or steps be employed.

I therefore particularly point out and distinctly claim as my invention:

1. The method of purifying crude cellulose ethers which comprises dissolving the crude ether in a non-aqueous solvent therefor, and treating the solution with chlorine.

2. The method of purifying crude cellulose ethers which comprises mixing the same with a solvent substantially inert to chlorine at room temperature, and treating the solution with chlorine.

3. The method of purifying crude cellulose ethers which comprises mixing the same with a solvent substantially inert to chlorine at room temperature, and bubbling gaseous chlorine thereinto.

4. The method of purifying crude cellulose ethers which comprises mixing the same with a solvent substantially inert to chlorine at room temperature, and adding thereto a solution of chlorine in an inert solvent.

5. The method of purifying crude ethyl cellulose which comprises dissolving the same in a substantially non-aqueous solvent therefor, and treating the solution with chlorine.

6. The method of purifying crude ethyl cellulose which comprises mixing the same with a solvent substantially inert to chlorine at room temperature, and bubbling gaseous chlorine thereinto.

7. The method of purifying crude ethyl cellulose which comprises mixing the same with a solvent substantially inert to chlorine at room temperature, and adding thereto a solution of chlorine in an inert solvent.

8. In a process for the purification of crude ethyl cellulose, the step which consists in treating an alcoholic solution thereof with chlorine.

9. In a process for the purification of crude ethyl cellulose, the step which consists in admixing an alcoholic solution thereof with a solution of chlorine in an inert solvent.

10. In a process for the purification of crude ethyl cellulose, the step which consists in admixing an alcoholic solution thereof with a solution of chlorine in carbon tetrachloride.

11. In a process for the purification of crude ethyl cellulose, the step which consists in treating a solution of the same in an inert solvent with an amount of chlorine equivalent to between about 1 per cent and about 10 per cent of the weight of the ethyl cellulose.

12. In a process for the purification of crude ethyl cellulose, the steps which consist in treating the same, in a substantially non-aqueous solvent therefor which is substantially inert to chlorine, with an amount of chlorine equivalent to about 4 per cent of the weight of the ethyl cellulose, thereafter mixing the resulting solution with water at a temperature above the boiling point of the solvent employed, thereby flashing off said solvent and precipitating ethyl cellulose, and recovering the precipitated ethyl cellulose.

RUSSELL R. BRADSHAW.